April 4, 1961 J. J. MORSCH 2,978,220
ROTATABLY-MOUNTED FAUCET WASHERS
Filed March 20, 1959
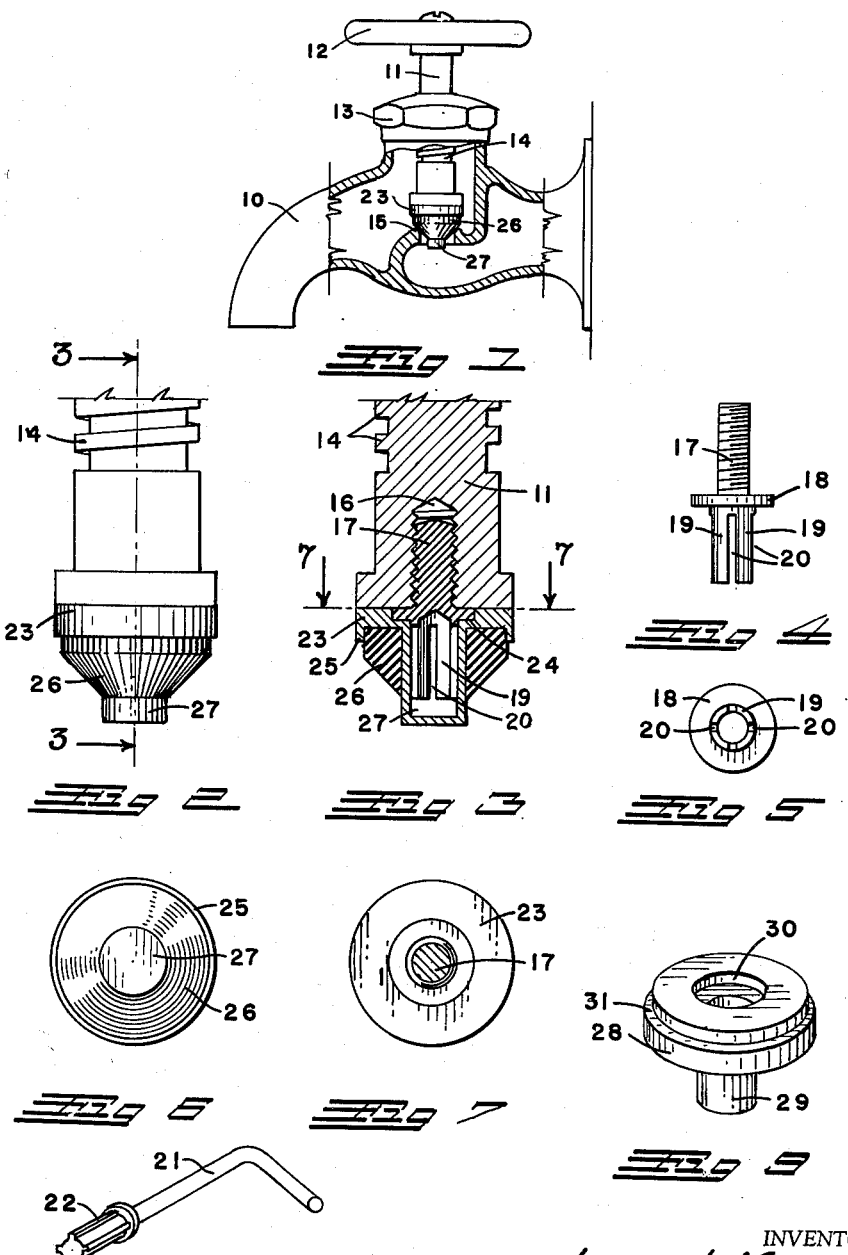
INVENTOR.
JESSE J. MORSCH
BY
ATTORNEY United States Patent Office 2,978,220
Patented Apr. 4, 1961

2,978,220
ROTATABLY-MOUNTED FAUCET WASHERS
Jesse J. Morsch, 408 N. 4th St., Douglas, Wyo.
Filed Mar. 20, 1959, Ser. No. 800,701
1 Claim. (Cl. 251—88)

This invention relates to a valve and more particularly to an improved washer seat for a valve. The invention is specifically designed for use in household type faucets but will be found useful in "globe" valves of any type.

The principal object of the invention is to provide a washer mounting which can be quickly and easily applied to any conventional valve stem and which will prevent relative rotation between the valve washer and the seat when the two have been brought into contact so as to eliminate the usual damaging frictional wear upon the washer and the seat during the final closing and initial opening of the valve.

Another object of the invention is to provide a valve of the above type which will maintain the valve washer in perfect axial alignment with its seat at all times; which will rotate the valve washer to a new position relative to the seat at each operation of the valve; which will eliminate loosening of the washer screw; and which can be quickly and easily renewed without the use of tools and without damage to the valve stem.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of a conventional faucet partially broken away to show the interior construction;

Fig. 2 is an enlarged, side view of the lower extremity of the valve stem of the faucet of Fig. 1 showing the improved washer seat in place thereon;

Fig. 3 is a similarly enlarged vertical section through the lower extremity of the valve stem and washer seat taken on the line 3—3, Fig. 2;

Fig. 4 is a detail side view of a pilot screw employed in the improved washer seat;

Fig. 5 is an end view of the pilot screw of Fig. 4;

Fig. 6 is a bottom view of the improved washer seat;

Fig. 7 is a top view thereof taken on the line 7—7, Fig. 3;

Fig. 8 is a perspective view of a tool which may be employed for installing the pilot screw of Fig. 4; and Fig. 9 is a perspective view of an alternate form of swivel disc for use in this invention.

In Fig. 1, a conventional faucet washer of the household type is illustrated at 10 with its valve stem at 11, handle at 12, and faucet sealing nut at 13. The stem 11 is provided with the usual axially-positioned threaded screw socket 16 in its lower extremity and is further provided with stem threads 14 for imparting vertical movement to the stem 11 as the handle 12 is rotated. The stem 11 is axially aligned with an annular valve seat 15.

This invention is designed to seal the valve stem 11 to the seat 15 to prevent flow through the faucet 10. Broadly, the invention contemplates providing a washer seat for rotatably supporting a sealing washer on the lower extremity of the stem 11. In applying the invention, a pilot screw 17 is threaded into the conventional screw socket 16.

The pilot screw 17 is provided with a stop flange 18 which comes into tight contact with the lower extremity of the valve stem 11 to limit the degree of insertion of the screw 17 and to securely clamp the screw 17 in place in the socket 16. A hollow, resilient, split stud is formed on and projects axially downward from the flange 18. The wall of the hollow stud is provided with a plurality of longitudinally-extending, circumferentially-spaced slits 20 which divide the wall of the stud into a plurality of parallel, flexible fingers 19.

The pilot screw 17 is threaded into the socket 16, by means of any suitable tool, until the stop flange 18 tightly frictionally engages the bottom of the stem 11. A more specific tool for this use is illustrated in Fig. 8 consisting of a bent wrench rod 21 provided with a plurality of longitudinally-extending keys 22 for engagement in the slits 20 when the rod is inserted in the hollow stud. The pilot screw is designed to receive, retain, and align a circular swivel disc 23 on the lower extremity of the valve stem 11.

A circular socket 24 is formed in the top of the swivel disc 23 to receive the circular stop flange 18 and an annular peripheral, downwardly projecting flange 25 is formed thereon for receiving a faucet washer 26. The faucet washer 26 is preferably of the conventional conical type formed of neoprene, rubber or other suitable resilient material, the material depending upon the services required. A tubular cup 27 is formed integrally with and extends downwardly and concentrically from the swivel disc 23 through the usual screw hole in the washer 26 and projects downwardly below the latter. The internal diameter of the cup 27 is slightly less than the normal external diameter of the stud fingers 19 so that when the swivel disc 23 is forced into position on the lower extremity of the valve stem, the fingers 19 will be flexed slightly inward to maintain frictional contact with the inner surface of the cup 27 so as to retain the swivel disc 23 in place during assembling and disassembling of the valve structure.

The device is assembled in the faucet, as shown in Figs. 1, 2, and 3, so that when the faucet handle 12 is rotated the washer 26 will come into contact with the valve seat 15. The instant it contacts the seat, rotation of the washer and the swivel disc immediately stops. Further rotation of the valve stem 11 simply rotates the resilient fingers 19 within the cup 27 and the swivel disc against the bottom of the stem 11 so that the valve stem threads 14 may act to force the valve stem downwardly to place the sealing washer 26 under compression without any damaging frictional engagement between the washer and its seat 15.

It can be seen that it will take less effort to open or close the valve since the high coefficient of friction between the resilient washer and the valve seat is totally eliminated; that the pilot screw will always hold the swivel disc and washer in perfect alignment with both the valve stem and the valve seat at all times; that due to the relative movement between the swivel head and the valve stem, the sealing washer 26 will constantly change its position relative to the seat 15 so as to prevent undue wear at any point; and that due to the less pressure required, there is less wear on the valve stem threads 14. Should the valve seat be pitted or indented, it will not interfere with the perfect seal of the washer 26 for, since there is no rotation against the pits or the indentations, the washer will be simply forced donwardly into the latter to obtain a perfect sealing effect. The size and shape of the sealing washer 26 is preferably such that it must be forcibly forced over the cup 27 and within the embrace of the flange 25 so that leakage therebetween is totally eliminated. To still further insure the nonleaking qualities of the improved valve, the washer 26 can be cemented in the swivel disc 23.

When it is desired to renew the washer 26, it is not necessary to remove the pilot screw 17 for the old swivel disc can simply be gripped in the fingers and pulled from the frictional engagement of the stud fingers 19 and discarded. A new disc and washer assembly can then be simply pushed into place over the stud fingers and against the flange 18.

Certain types of valve stems are provided with a thin peripheral flange about their lower surfaces to retain a sealing washer in place thereof. This flange can be quickly and easily broken away with a pair of pliers to provide a continuous surface for the swivel disc 23. The flange 25 will replace the removed flange. However, should it not be desirable to break away the present flanges, an alternate type of swivel disc such as shown at 28 in Fig. 9 can be employed. The alternate type of swivel disc is similar to the swivel disc 23, that is, it is provided with an indentation 30 similar to the circular socket 24 and with a cup 29 similar to the cup 27 previously described. The disc 28, however, is provided with an indented shoulder 31 about its upper edge to receive the peripheral flange with which some valve stems are provided so that breaking away of the flange will be unnecessary.

The pilot screw 17 may be manufactured in any desired manner. A preferable method of manufacture is to machine the entire unit in a crew machine to form the proper screw threads, the flange 18 and a cylindrical lower extremity of a diameter to fit snugly, yet rotatably within the cup 27. The stud is then drilled to form the hollow center therein and the slits 20 are sawed or milled therein to form the fingers 19. A tapered tool is then forced into the hollow center of the stud to expand the fingers to produce resilient friction against the cup 27 sufficient to retain the swivel disc in place during assembly and disassembly and to prevent hydraulic vibration of the disc. The pilot screw is then heat-treated so that the fingers will maintain their resiliency during the life of the faucet.

While a specific form of the improvement has been described and illustrated herein, it is to be understood that the same may be varied within the scope of the appended claim, without departing from the spirit of the invention.

Having thus described the invention what is claimed and desired secured by Letters Patent is:

Means for mounting a sealing washer on a valve stem of the type having an axially-positioned threaded socket in its lower extremity comprising: a pilot screw threaded into said socket; a circular, disc-like head formed on and projecting radially from said pilot screw and contacting the extremity of said valve stem; a hollow, cylindrical stud formed on and projecting axially from said head opposite to said pilot screw, there being a plurality of longitudinally-extending, circumferentially-spaced slits formed in the cylindrical wall of said hollow stud to impart compressibility to said stud; an axially-positioned tubular cup forced over and compressing said stud; a circular disc formed on and about the open extremity of said cup; and a sealing washer surrounding said cup and resting against said circular disc.

References Cited in the file of this patent
UNITED STATES PATENTS

| | | |
|---|---|---|
| 2,077,766 | Mead | Apr. 20, 1937 |
| 2,148,195 | Esnard | Feb. 21, 1939 |